Feb. 25, 1947. C. H. TAYLOR 2,416,417
CONVERTIBLE PNEUMATIC CLEANING APPARATUS
Filed April 30, 1943 4 Sheets-Sheet 1

WITNESSES:

INVENTOR
CHARLES H. TAYLOR.
BY
ATTORNEY

Feb. 25, 1947.   C. H. TAYLOR   2,416,417
CONVERTIBLE PNEUMATIC CLEANING APPARATUS
Filed April 30, 1943   4 Sheets-Sheet 2
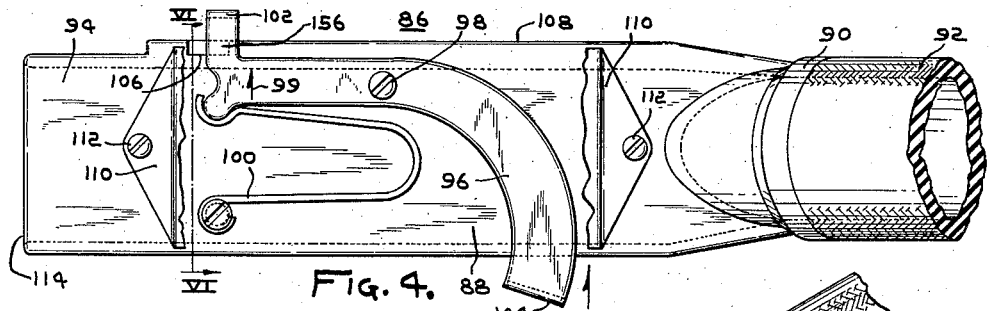
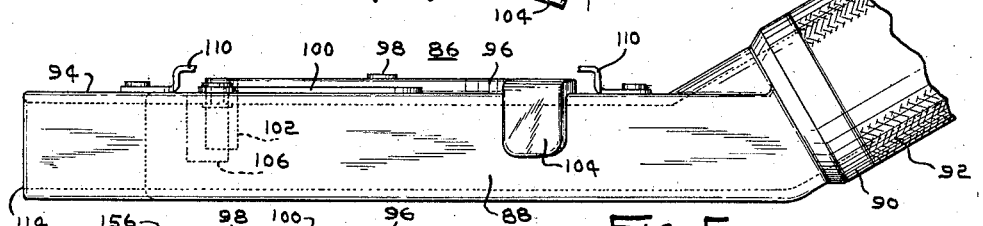
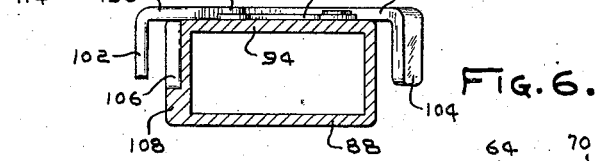
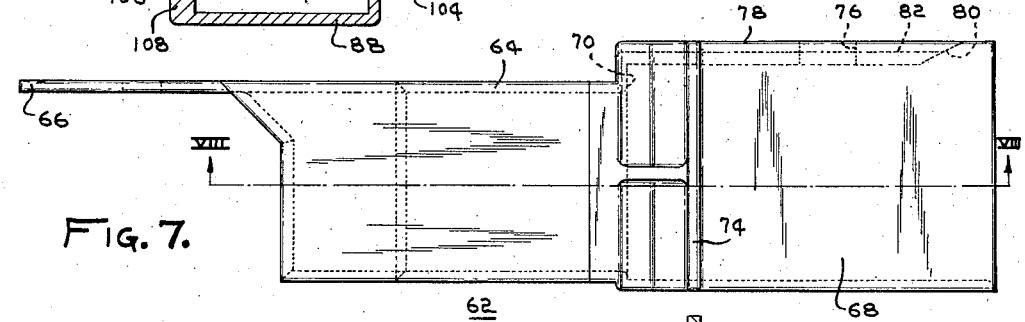
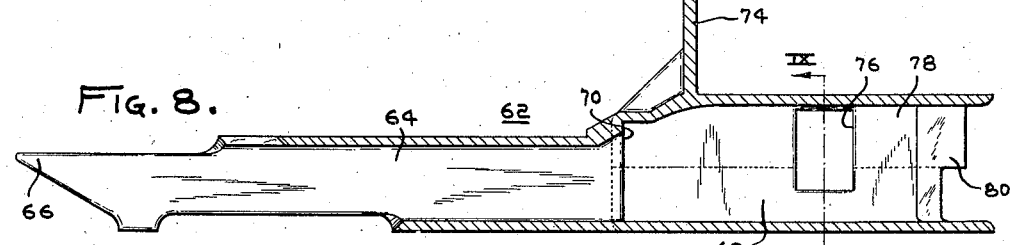
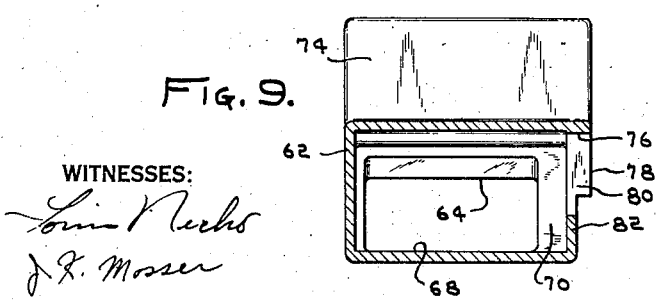
WITNESSES:
INVENTOR
CHARLES H. TAYLOR.
BY
ATTORNEY

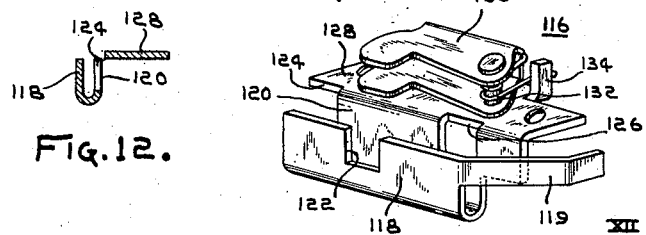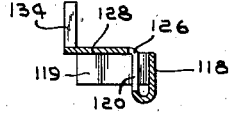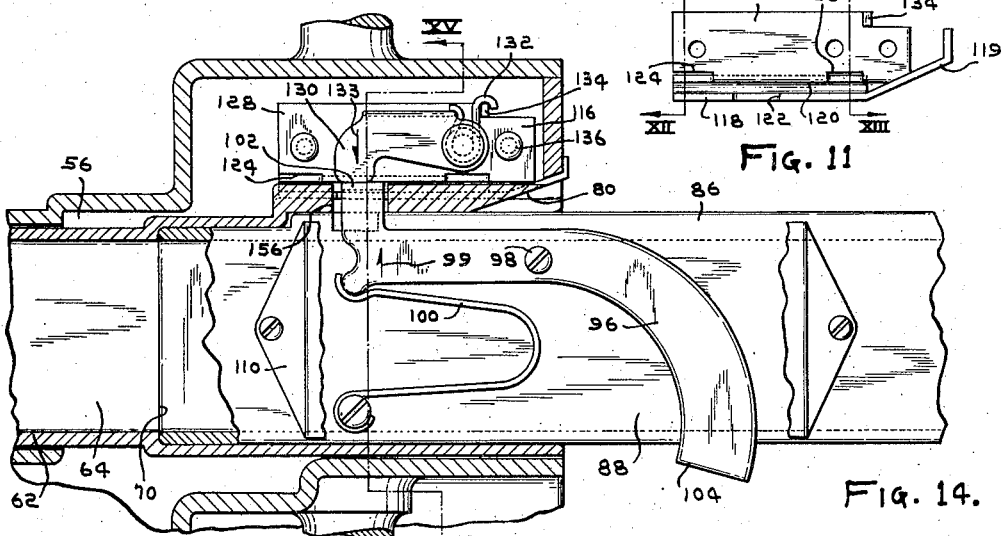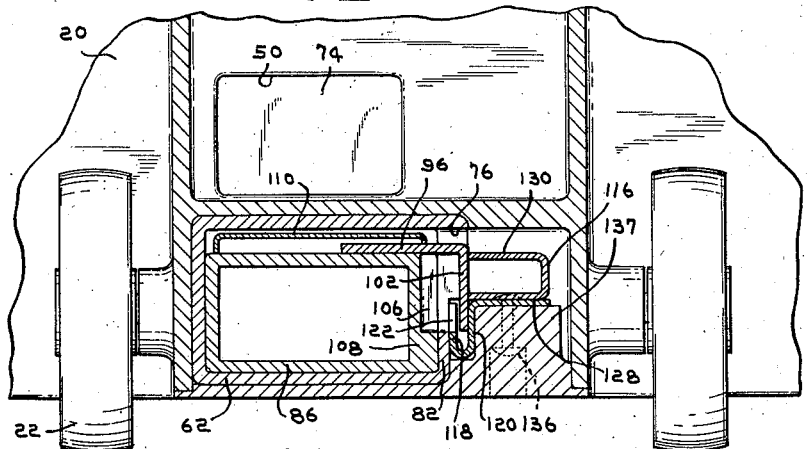

INVENTOR
CHARLES H. TAYLOR.
BY R. J. Eisinger
ATTORNEY

Patented Feb. 25, 1947

2,416,417

UNITED STATES PATENT OFFICE 2,416,417

CONVERTIBLE PNEUMATIC CLEANING APPARATUS

Charles H. Taylor, Springfield, Mass., assignor to Westinghouse Electric Corporation, East Pittsburgh, Pa., a corporation of Pennsylvania Application April 30, 1943, Serial No. 485,185

11 Claims. (Cl. 15—9)

My invention relates to a suction cleaner, and more particularly to a suction cleaner which is readily convertible from floor-nozzle cleaning to attachment on-the-floor and off-the-floor cleaning, or to attachment blowing.

One object of my invention is to produce an improved suction cleaner of the type set forth.

A further object of my invention is to produce an improved converting mechanism for a cleaner of the type set forth, which is easy to manipulate.

A still further object of my invention is to produce a suction cleaner of the type set forth in which the converting mechanism is built into and forms part of the cleaner construction, while the means for actuating the converting mechanism from one operative position to the other is carried by the inner end of an attachment hose.

A still further object of my invention is to produce a converting mechanism which is moved from one operating position to another by a simple endwise movement of the inner end of said attachment hose.

A still further object of my invention is to produce an improved construction which includes locking means for retaining said converting mechanism against unintended movement from any operative position to which it may have been adjusted, together with means for insuring the return of the converting mechanism to the position it occupies while the cleaner is used for floor-nozzle cleaning before the attachment hose can be disconnected from the cleaner.

The air valve arrangement shown herein for converting from floor nozzle cleaning to attachment suction cleaning or attachment blowing is claimed in my Patent No. 2,375,331.

These and other objects are effected by my invention as will be apparent from the following description and claims taken in connection with the accompanying drawings, forming a part of this application, in which:

Fig. 4 is a plan view of an adapter carried by the inner end of an attachment hose and constituting the actuating means for adjusting the converting mechanism from one operative position to another;

Fig. 5 is a side elevation of the device shown in Fig. 4;

Fig. 6 is a section on line VI—VI of Fig. 4;

Fig. 7 is an enlarged top plan view of a slide forming a part of the built-in converting mechanism, the same being shown detached;

Fig. 8 is a vertical sectional view on line VIII—VIII of Fig. 7;

Fig. 9 is a vertical sectional view on line IX—IX of Fig. 8;

Fig. 10 is a perspective view of a built-in guiding and latching mechanism which cooperates with the converting mechanism of Fig. 4 and the insert of Fig. 7;

Fig. 11 is a top plan view of one of the parts shown in Fig. 10;

Fig. 12 is a section on line XII—XII of Fig. 11;

Fig. 13 is a section on line XIII—XIII of Fig 11;

Fig. 14 is a horizontal sectional view similar to Fig. 2 showing the insert of Fig. 4 introduced into the slide shown in Fig. 7 but with the suction cleaner adjusted to floor-nozzle cleaning;

Fig. 15 is a section on line XV—XV of Fig. 14;

Figure 1:
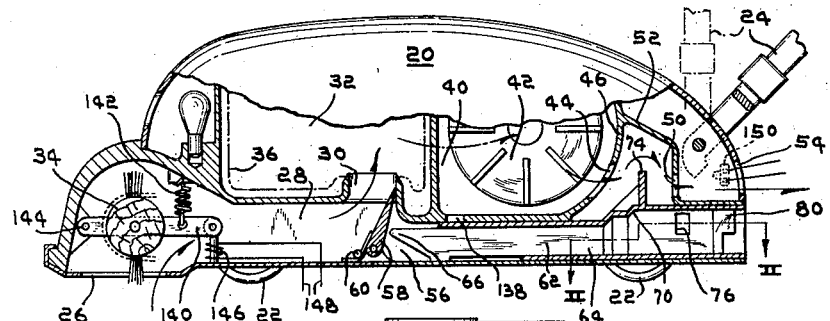
Fig. 1 is a view partly in elevation of a suction cleaner embodying my invention.

Referring to the drawings and more particularly to Fig. 1, I show a suction cleaner 20, mounted on wheels 22 and provided with a pivoted propelling handle 24. The cleaner 20 comprises a floor cleaning nozzle 26 which is connected by a passage 28 and a throat 30 to a dust bag compartment 32. In the nozzle 26 is mounted a brush roll 34.

In the dust bag compartment 32 is a filter bag 36, the inlet end of which communicates with the throat 30. The filter bag 36 may be removed for emptying through an opening (not shown). The compartment 32 communicates through an opening (not shown) with a discharge compartment 40, which houses a suction-creating device. The suction-creating device includes a motor fan unit generally designated by the reference numeral 42, with the shaft 43 of the motor rotating about a horizontal axis. The compartment 40 is provided with an outlet 44 formed in a wall of the fan motor unit housing 46. The opening 46 communicates with an opening 50 in a pendant wall 52. The opening 50 communicates with the atmosphere through an opening 54 formed in the outer casing of the cleaner.

In order to render the cleaner thus far described convertible to attachment suction cleaning in an on-the-floor or off-the-floor manner, or to attachment blowing, I provide a passage 56 which is normally closed off from the passage 28 and throat 30, by a valve 58. The valve 58 is biased into closing position by a spring 60. In the passage 56 is positioned a slide 62 which, as will be seen from Figs. 7, 8 and 9, includes a reduced inner portion 64, having one side wall extended to form a finger 66, and an outer enlarged portion 68 separated from the reduced portion 64 by a shoulder 70. The slide 62 also carries a shutter 74 which, when the slide is in its outermost position, is adapted to close the opening 50.

The enlarged portion 68 of the slide 62 is provided with an opening 76 formed in a side wall 78, the outer end of which is bevelled to form a cam 80. As shown in Fig. 9, the lower portion 82 of the side wall 78 is made thinner than the upper portion thereof, thus providing an outer surface offset inwardly from that of the upper portion.

The slide 62 is adapted to assume one position when the cleaner is used for floor-nozzle cleaning, a second position when the cleaner is used for attachment suction cleaning, and a third position when the cleaner is used for attachment blowing. In order to actuate the slide 62, and detachably to connect it to an attachment hose, I use an adapter 86 which is shown detached in Figs. 4 to 6. The adapter 86 comprises an elongated conduit 88 terminating in a coupling 90 to which is connected one end of an attachment hose 92, the other end of which carries a suitable cleaning tool (not shown). On the top wall 94 of the adapter 86 is mounted a lever 96 which is fulcrumed at 98 and biased in the direction of the arrows 99 by a spring 100. The lever 96 terminates at one end thereof in a pendant latch member 102 and at the other end thereof in a pendant grip portion 104. The pendant latch member 102 is adapted to be withdrawn, against the action of the spring 100, into a seat or recess 106 formed in a side wall 108 of the adapter 86. The lever and spring assembly are preferably concealed by a cover 110 secured to the top wall 94 by screws 112. In several views, the cover 110 is broken away so as to expose the lever and spring construction. When the adapter 86 is inserted into the slide 62, the end 114 thereof abuts against the shoulder 70.

In order to retain the slide 62 against accidental displacement while the cleaner is used for floor-nozzle cleaning, and in order to interlock the slide 62 and adapted 86 for joint movement in the process of converting the cleaner from floor-nozzle cleaning to attachment suction cleaning or to attachment blowing, I provide a latching device 116 which is shown detached in Fig. 10. This device comprises a U-shaped member having side walls 118 and 120, there being a notch 122 in the side wall 118 and spaced notches or openings 124 and 126 in the wall 120. The side walls 118 and 120 define an elongated trough in which the lower end of the pendant latch 102 is adapted to move, as shown in Fig. 15. The side wall 118 is provided with a deflected guide extension 119 which, when the cleaner is in the floor-nozzle cleaning position, forms a continuation of the cam surface 80 (see Figs. 2 and 14) to guide and facilitate the insertion of the adapter 86 into the slide 62. The wall 120 is extended to form a shelf member 128 on which is pivoted a latch member 130. The latch member 130 is biased by a spring 132 in the direction of the arrow 133 (Fig. 14), one end of the spring 132 being conveniently anchored by a post 134 struck up from the top wall or shelf 128. The latching device 116 is rigidly secured to the cleaner body in operative relation to the slide 62 and the adapter 86 by bolts or rivets 136 passing through a boss 137 formed in the body of the cleaner to one side of the passage 56, as best shown in Fig. 15.

Figure 16:
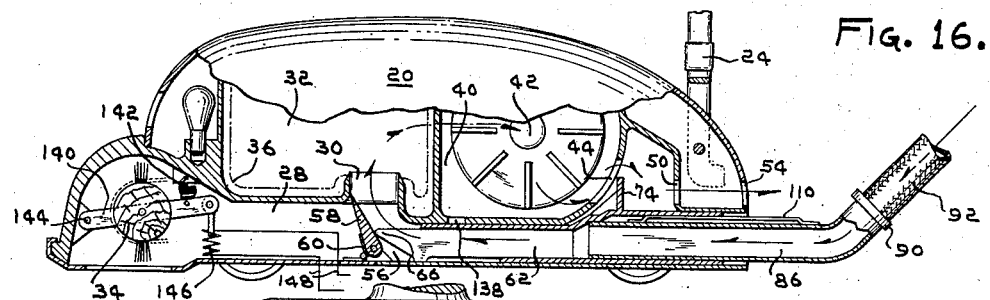
Fig. 16 is a view similar to Fig. 1 showing the suction cleaner adjusted for attachment-hose suction.
Figure 18:
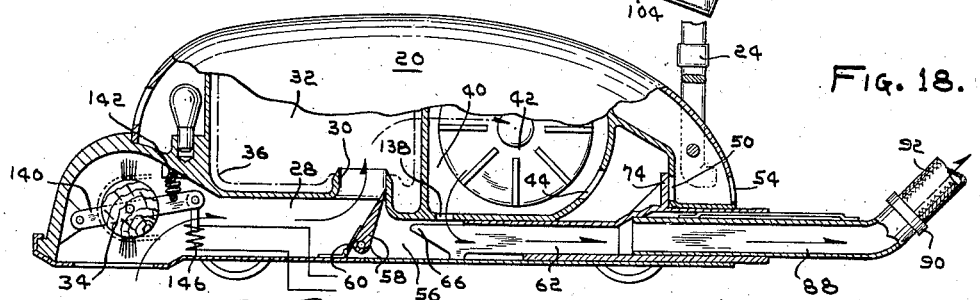
Fig. 18 is a view similar to Figs. 1 and 16 showing the cleaner being used for attachment blowing; and, Fig. 19 is a view similar to Fig. 17 showing the position which is assumed by the converting mechanism when the cleaner is used for attachment blowing.
Figure 19:
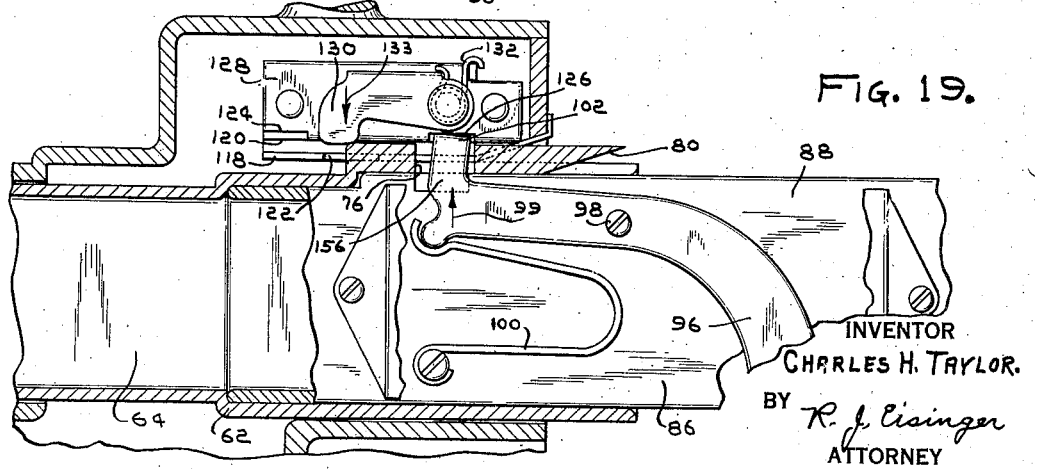

The compartment 40 is provided with a bottom opening 138 which, in the positions of the cleaner illustrated in Figs. 1 and 16, is closed by the top wall of the slide 62 but which, in the position of the cleaner illustrated in Fig. 18, is uncovered and communicates with the open end of the slide 62 for a purpose hereinafter set forth.

Figure 3:
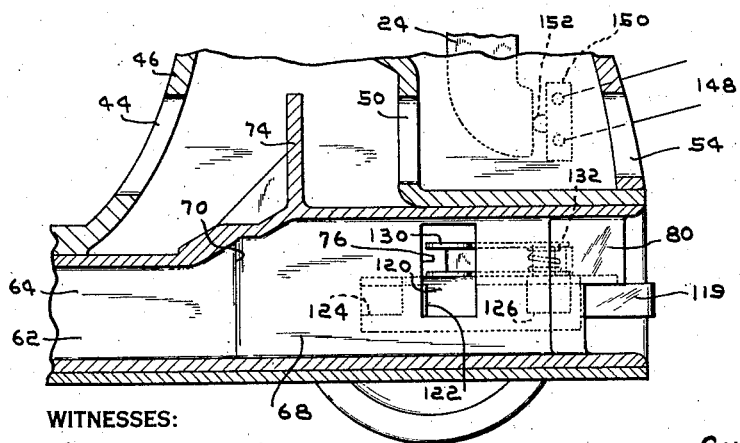
Fig. 3 is a sectional view taken on line III—III of Fig. 2.

In order to raise the brush roll 34 out of contact with the surface being cleaned while the apparatus is used for attachment suction or blowing, the brush roll 34 is carried by an arm 140 which is biased upwardly by a spring 142. One end of the arm 140 is pivoted at 144 to a portion of the nozzle wall and the other end thereof is pivoted to the core of a solenoid 146. The solenoid 146 is connected by wires 148 to a switch 150. The switch 150 includes a button 152 which is biased outwardly by a spring (not shown) to close the circuit and energize the solenoid 146. When energized, the solenoid 146 pulls the brush roll down into contact with the surface being cleaned. The switch 150 is so constructed and arranged that the button 152 is unaffected by movement of the handle 24 in its normal range of operation (Fig. 1) but, when the handle is in a vertical position, the button 152 is pushed inwardly by the lower portion of the handle (Fig. 3). In the inner position of the button 152, the circuit is broken, the solenoid is deenergized and the brush roll 34 is raised out of contact with the surface being cleaned by the spring 142 acting on the arm 140.

*Operation—Fig. 1*

As shown in Fig. 1, the cleaner is adjusted for floor cleaning through the nozzle 26. In this position, the slide 62 is in a central or intermediate position so that its end 66 is out of contact with valve member 58 which is biased by the spring 60 into the position closing the passage 56 from the throat 30 and the suction-creating device 42. Likewise, the shutter 74 does not close the opening 50, and the opening 138 is closed by the top wall of the slide 62. The solenoid 146 is energized and the brush roll 34 is in contact with the surface being cleaned. In this position, the air drawn by the suction device 42 travels through the nozzle 26, passage 28, throat 30, dust bag 36, into the discharge compartment 40 through the fan inlet, and out through the openings 44, 50 and 54. The slide 62 is retained in this position by the latch 130 engaging in the opening 76, as shown in Fig. 2.

*Conversion*

Figure 2:
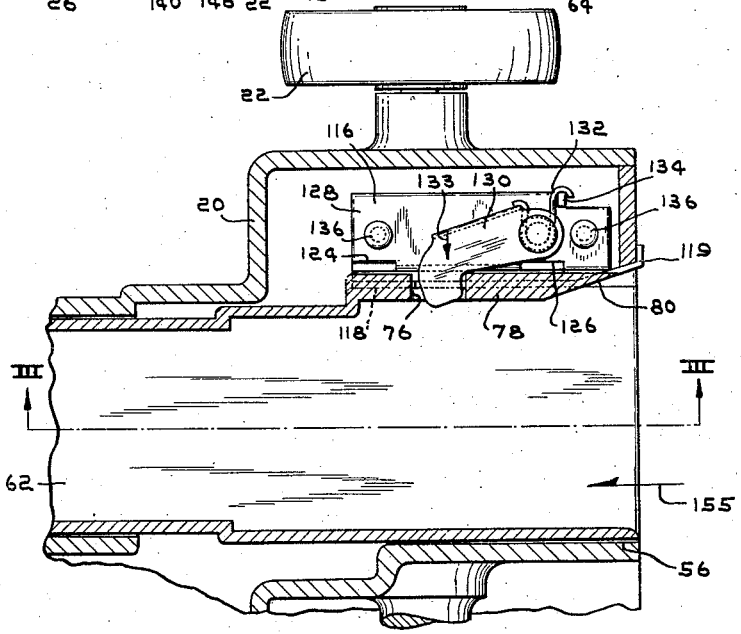
Fig. 2 is a fragmentary enlarged sectional view on line II—II of Fig. 1.

When it is desired to convert the cleaner to attachment suction or attachment blowing, the adapter 86 is inserted into the slide 62 in the direction of the arrow 155 in Fig. 2. During the insertion of the adapter 86 into the slide 62, the outwardly-projecting latch 102 rides on the cam surface 80 (best shown in Fig. 2). As the adapter 86 progressively moves into the slide 62, the latch 102 is automatically forced into the seat 106 in the side wall 78 of the adapter 86. When the adapter 86 and slide 62 are in the position illustrated in Fig. 14, in which the opening 76 is in registration with the opening 122, the latch 102 is biased outwardly by the spring 100, which is stronger than the spring 132, to push the latch 130 out of the opening 76. The slide 62 and adapter 86 are now latched together by engagement of the horizontal portion 156 of the latch with the walls of the opening 76, and are free to move as a unit with the lower portion of the latch 102 sliding against the wall 120. As will be seen from Figs. 9 and 15, the wall 118 of the latching device 116 slidably abuts against the lower reduced portion 82 of the side wall 78 of the slide 62, while the latch 130 rides upon the outer face of the upper portion of the latch 102 or on the surface of the thick portion of the wall 78 above the shoulder 84.

*Attachment suction cleaning*

Figure 17:
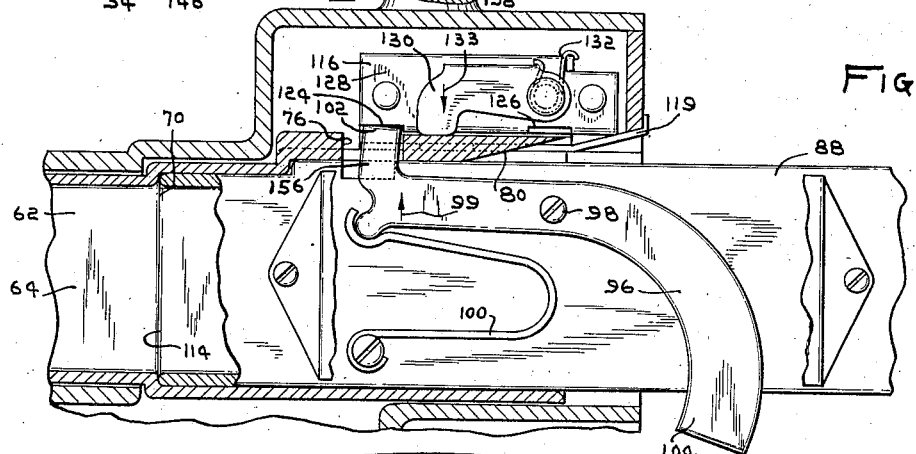
Fig. 17 is a view similar to Fig. 14 but showing the position which is assumed by the converting mechanism when the cleaner is used for attachment hose suction.

If it is desired to use the cleaner for attachment suction cleaning, the slide 62 and adapter 86 are moved to the innermost position, shown in Figs. 16 and 17. In this position, the finger 66 of the slide 62 engages and actuates the valve 58 from the position shown in Fig. 1 to that shown in Fig. 16, in which the floor nozzle 26 is cut off from the throat 30, and in which the throat 30 is now in communication with the interior of the passage 56, slide 62, adapter 86 and the attachment hose 92. In this position, the latch 102 is engaged in the notch 124 to prevent accidental movement of the slide and adapter. The air is now drawn into the dust bag 36 through the attachment hose 92 and is discharged through the openings 44, 50 and 54, as shown by the arrows in Fig. 16.

*Attachment blowing*

Assuming that it is desired to convert the cleaner from attachment suction cleaning to attachment blowing, it is merely necessary to press the grip portion 104 of the lever 96 inwardly to retract the latch 102 from the opening 124. Thereupon, the lower portion of the latch 102 can slide freely in the trough between the walls 118 and 120 of the latching device 116, and the interlocked slide 62 and adapter 86 are moved to the right in Fig. 18 until the shutter 74 closes the opening 50. In this position, the opening 138 is uncovered and communicates with the passage 56 and the valve 58 closes the passage 55 from the throat 30. Air is now drawn by the suction device 42, through the nozzle 26, in the direction of the arrows in Fig. 18 and, since the discharge opening 50 is closed by the shutter 74, the filtered air is discarged through the opening 138 into the passage 56 and through the slide 62, the adapter 86 and the attachment hose 92. To guard against accidental displacement of the slide 62 and adapter 86 from this position, the latch 102 engages the opening 126 in the latching device 116.

If the cleaner is to be converted directly from floor cleaning to attachment blowing, the slide 62 and adapter 86 are inserted as shown in Fig. 2, but instead of being moved inwardly to the position shown in Fig. 16, they are moved outwardly to the position shown in Fig. 18.

To reconvert the cleaner from either attachment suction or attachment blowing to floor-nozzle cleaning, the latch 102 is withdrawn from the opening 124 or 126 and the slide and adapter are moved back as a unit to the central position illustrated in Fig. 2, in which the latch 102 is retracted through the opening 122. The adapter 86 may now be withdrawn, and, as the latch 102 is retracted through the opening 122, the latch 130, biased by the spring 132, immediately enters the opening 76 in the wall 78 of the slide to lock the latter in the intermediate or floor-nozzle cleaning position.

It will thus be seen that the construction is such that it is impossible for the operator to withdraw the adapter 86 without first bringing the adapter and the slide to the floor cleaning position of Fig. 2 and that simultaneously with the retraction of the latch 102, the latch 130 engages the opening 76 to lock the slide 62 in floor cleaning position.

From the foregoing, it will be seen that I have devised a suction cleaner which is readily converted to attachment cleaning or attachment blowing by mere insertion of an adapter attached to one end of an attachment hose, and by moving the adapter to an extreme inner or extreme outer position to adjust the cleaner to attachment suction or attachment blowing, respectively.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What is claimed is:

1. A suction cleaner comprising a suction-creating device, a floor nozzle communicating with the low pressure side of said device, there being a normally open outlet leading from the high-pressure side of said suction-creating device to the atmosphere, means carried by said cleaner and forming a passage, a hollow, open-ended slide movable into inoperative and operative positions in said passage, there being an opening in said passage leading to the high-pressure side of said suction-creating device, said opening being normally closed by a wall of said slide when said slide is in its inoperative position, a hollow, open-ended adapter internally connected to an extension hose and insertable into said slide, valve means carried by said slide and operative to close said outlet, and means for integrating said adapter and said slide for joint movement from one position to another within said passage, said adapter, said slide, said opening and said valve means being so constructed and arranged that the movement of said slide from its inoperative to its operative position closes said outlet and establishes communication between said passage and the high-pressure side of said device.

2. The combination with a suction cleaner including a suction-creating device and a floor nozzle normally connected with the low-pressure side of said suction-creating device, there being an outlet leading from the high-pressure side of said suction-creating device to the atmosphere, of means for converting said cleaner from nozzle cleaning to attachment suction or attachment blowing, including a hollow, open-ended slide carried by said cleaner and movable into one inoperative and two operative positions, means operable upon movement of said slide from said inoperative position to one of said operative positions to shut said nozzle off from said suction-creating device and to connect said slide to the low-pressure side of said suction-creating device, and upon movement of said slide from said inoperative position to the other of said operative positions to close said outlet and to connect said slide to the high-pressure side of said suction-creating device, a hollow, open-ended adapter connected interiorly to an attachment hose and insertable into said slide, and means for integrating said slide and said adapter for joint movement from one position to another.

3. The structure recited in claim 2 together with means for locking said slide in its inoperative position and means for locking said slide and said adapter in either of said operative positions.

4. The combination with a suction cleaner including a suction-creating device, there being a normally open outlet leading from the high-pressure side of said suction-creating device to the atmosphere, a floor nozzle, means carried by said cleaner and forming a passage, and a valve for selectively connecting said passage or said nozzle to the low pressure side of said device, of means for converting said cleaner from floor-nozzle cleaning to attachment suction or attachment blowing including a hollow open-ended slide movable in said passage, said slide having one inoperative and two operative positions, means operable upon movement of said slide to one of its operative positions to connect said slide to the low pressure side of said device, means operable by movement of said slide to its other operative position to close said outlet and to connect said slide to the high pressure side of said suction-creating device, locking means for retaining said slide in its inoperative position when the cleaner is used for floor-nozzle cleaning, a hollow, open-ended adapter connected to an attachment hose and insertable into said slide, means carried by said adapter for disengaging said locking means and for integrating said slide and said adapter for joint movement from said inoperative to either of said operative positions, and means for locking said slide and said adapter in either of said positions.

5. The structure recited in claim 4 in which said adapter, slide and locking means are so constructed and arranged that said adapter cannot be removed from said slide except when the latter is in its inoperative position and in which said locking means automatically engages said slide as said adapter is disengaged therefrom.

6. A suction cleaner comprising a suction-creating device, a floor nozzle, means carried by said cleaner and forming a passage, a valve for selectively connecting said nozzle or said passage to the low pressure side of said device, a hollow, open-ended slide movable into one inoperative and two operative positions in said passage, there being a normally open outlet leading from the high-pressure side of said suction device to the atmosphere, and an opening leading from the high pressure side of said device to said passage, said opening being normally closed by a wall of said slide in one position thereof, a tubular, open-ended adapter connected to an extension hose and insertable into said slide, and means for integrating said adapter and said slide for joint movement from said inoperative position to either of said operative positions within said passage, said adapter and said slide being so constructed and arranged that in one operative position thereof, said valve is actuated to shut said nozzle off from and to connect said slide, adapter and hose to the low pressure side of said device, and in another position of said slide and adapter, said outlet is closed and said opening communicates with said slide, adapter and hose.

7. The combination with a suction cleaner including a suction-creating device, a floor cleaning nozzle normally communicating with the low-pressure side of said suction-creating device, there being an outlet leading from the high-pressure side of said suction-creating device to the atmosphere, of means for rendering said suction cleaner convertible from floor nozzle suction to attachment suction or attachment blowing comprising means carried by said casing defining a passage, a valve for selectively connecting said nozzle or said passage to the low-pressure side of said suction-creating device, a hollow open-ended slide movable in said passage to one inoperative and two operative positions, there being an opening leading from the high-pressure side of said suction-creating device to said passage, said opening being closed by a wall of said slide in certain positions thereof, there being a side opening in a wall of said slide, a latch disposed near said passage and adapted to engage said side opening in said slide when said slide is in its inoperative position, a hollow open-ended adapter connected to an extension hose and insertable into said slide, a latch carried by said adapter and adapted to project through said side opening in said slide to disengage said slide from said first-mentioned latch and to integrate said adapter and said slide for joint movement from one position to another within said passage, a locking device also disposed near said passage, there being one notch in said locking device adapted to be engaged by said second-mentioned latch in one operative position of said slide and another notch adapted to be engaged by said second-mentioned latch in the other operative position of said slide, and a shutter carried by said slide and adapted in one operative position of said slide to close said outlet.

8. The combination with a suction cleaner including a suction-creating device, a floor cleaning suction nozzle normally communicating with the low pressure side of said suction-creating device, of means for rendering said suction cleaner convertible from floor nozzle suction cleaning to attachment suction cleaning or to attachment blowing comprising means defining a passage, a valve for selectively connecting said nozzle or said passage to the low pressure side of said suction-creating device, a member movable in said passage to one inoperative and two operative positions, there being an opening leading from the high pressure side of said suction-creating device to said passage, said opening being closed by a wall of said member in certain positions thereof, there being an aperture in said member, a latch disposed near said passage and adapted to engage said aperture when said member is in its inoperative position, an adapter connected to an extension hose and insertable into said passage, a latch carried by said adapter and adapted to project through said aperture to disengage said member from said first-mentioned latch and to integrate said adapter and said member for joint movement from one position to another within said passage and a locking device also disposed near said passage, there being one notch in said locking device adapted to be engaged by said second-mentioned latch in one operative position of said member and another notch adapted to be engaged by said second-mentioned latch in the other operative position of said member.

9. The combination with a suction cleaner including a casing, a suction device in said casing, and a floor nozzle carried by said casing and adapted to be presented to a floor surface to be cleaned, said nozzle being normally connected to the low pressure side of said suction device, of means for converting said cleaner from floor nozzle operation to operation through an attachment hose, said means including a wall structure carried by said casing and defining a passage, a valve movable selectively to connect said nozzle or said passage to the low pressure side of said suction device, a member disposed in a first position in said passage, which position corresponds to the floor nozzle operation of the cleaner, means latching said member in said first position, means causing said valve, in said first position of said member, to shut said passage from, and to connect said nozzle to, the low pressure side of said suction device, an adapter connected to an attachment hose and connectible to said passage, means operable by connection of said adapter with said passage for disengaging said latching means to permit movement of said member to a second position, means operable by movement of said member to said second position to actuate said valve to shut said nozzle off from, and to connect said passage and said attachment hose to, the low pressure side of said suction device, means for latching said member in said second position, and means for preventing disconnection of said adapter from said passage when said member is out of said first position.

10. The structure recited in claim 9 in which said member is moved from one position to the other by said adapter.

11. The combination with a suction cleaner including a casing, a suction device in said casing, and a floor nozzle carried by said casing and adapted to be presented to a floor surface to be cleaned, said nozzle being normally connected to the low pressure side of said suction device, there being an outlet leading from the high pressure side of said device to the atmosphere, of means for converting said cleaner from floor nozzle suction cleaning to suction cleaning or blowing through an attachment hose, said means including a wall structure carried by said casing and defining a passage, a valve movable selectively to connect said nozzle or said passage to the low pressure side of said suction device, a member disposed in a first position in said passage, means for latching said member in said first position, means causing said valve, in said first position of said member, to shut said passage from, and to connect said nozzle to, the low pressure side of said suction device, valve means operable, in said first position of said member, to connect the high pressure side of said suction device to the atmosphere, an adapter connected to an attachment hose and connectible to said passage, means operable by connection of said adapter with said passage for disengaging said latching means to permit movement of said member to a second position, means operable by movement of said member to said second position to actuate said valve to shut said nozzle off from, and to connect said passage and said attachment hose to, the low pressure side of said suction device, means for latching said member in said second position, said member being movable to a third position, means causing said valve means, in said third position of said member to shut said outlet and to connect said passage and said attachment hose to the high pressure side of said suction device, means for latching said member in said third position, and means for preventing disconnection of said adapter from said passage when said member is out of said first position.

CHARLES H. TAYLOR.

REFERENCES CITED

The following references are of record in the file of this patent:

UNITED STATES PATENTS

| Number | Name | Date |
|---|---|---|
| 2,070,689 | Smellie | Feb. 16, 1937 |
| 980,944 | Hatch | Jan. 10, 1911 |
| 2,076,390 | White | Apr. 6, 1937 |
| 1,953,944 | Becker | Apr. 10, 1934 |
| 1,907,644 | Fairfax | May 9, 1933 |

FOREIGN PATENTS

| Number | Country | Date |
|---|---|---|
| 373,199 | German | Apr. 9, 1923 |
| 646,509 | French | Dec. 17, 1929 |
| 294,961 | British | Jan. 31, 1929 |